US006199061B1

(12) United States Patent
Blewett et al.

(10) Patent No.: US 6,199,061 B1
(45) Date of Patent: Mar. 6, 2001

(54) METHOD AND APPARATUS FOR PROVIDING DYNAMIC HELP TOPIC TITLES TO A USER

(75) Inventors: William John Blewett, Redmond; Eric Robert Hawley; Michael Philip Arcuri, both of Seattle, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/098,975

(22) Filed: Jun. 17, 1998

(51) Int. Cl.[7] ................................................ G06F 17/30
(52) U.S. Cl. ............................. 707/3; 707/1; 707/2; 707/5
(58) Field of Search .................................. 707/1, 2, 3, 4, 707/5, 10; 717/1; 706/45; 345/354; 709/329

(56) References Cited

U.S. PATENT DOCUMENTS

| 5,465,358 |   | 11/1995 | Blades et al. ........................ 345/339 |
|-----------|---|---------|------------------------------------------------|
| 5,613,090 | * | 3/1997  | Willems ............................... 709/329 |
| 5,644,739 | * | 7/1997  | Moursund ........................... 345/354 |
| 5,787,416 | * | 7/1998  | Tabb et al. .......................... 707/2 |
| 5,802,515 | * | 9/1998  | Adar et al. .......................... 707/5 |
| 5,875,446 | * | 1/1999  | Brown et al. ....................... 707/3 |
| 5,920,859 | * | 6/1999  | Li ........................................ 707/5 |
| 5,924,090 | * | 7/1999  | Krellenstein ....................... 707/5 |
| 5,940,831 | * | 8/1999  | Takano ............................... 707/10 |
| 5,953,718 | * | 9/1999  | Wical .................................. 707/5 |
| 5,983,221 | * | 11/1999 | Christy ............................... 707/5 |
| 5,991,756 | * | 11/1999 | Wu ...................................... 707/3 |
| 6,021,403 | * | 2/2000  | Horvitz et al. ..................... 706/48 |
| 6,102,967 | * | 8/2000  | Feigner et al. ..................... 717/1 |

OTHER PUBLICATIONS

"Intelligent Tool Tracker/Display," *IBM Technical Disclosure Bulletin*, vol. 37, No. 2A, pp. 175 (Feb. 1, 1999).
Harris, et al. "Inside WordPerfect 6 for Windows", New Riders Publishing, pp. 1058–1063 (1994).
"Suitable Icon," *IBM Technical Disclosure Bulletin*, vol. 39, No. 11, pp. 63–64 (Nov. 1, 1996).

* cited by examiner

*Primary Examiner*—Thomas G. Black
*Assistant Examiner*—Diane D. Mizrahi
(74) *Attorney, Agent, or Firm*—Kilpatrick Stockton LLP

(57) ABSTRACT

A on-line help module provides a method and apparatus for the presenting of recognizable topic titles to a user in response to receiving a query. The system receives a query from a user and analyzes the query with a word breaking routine so to obtain a list of keyword terms that are substantively representative of the query. Based on the list of keyword terms, certain links are located in a database that serve to link the keyword terms to relevant topic titles. A link list is formed of all the relevant links and sorted. The links also include specific substitution information associated with them for application to the associated topic title. A substitution list is formed containing all the substitution information from the various links that were located. From the substitution list, all conflicts among the substitution information are removed and, thereafter, the substitutions are performed on the topic titles in accordance with the substitution information and presented to the user. The substitutions are directed toward swapping specified text into the topic titles in a manner such that terms that are the same as or similar to the terms initially used in the user's query will appear in the topic titles when presented to the user.

27 Claims, 9 Drawing Sheets

KEYWORD TABLE 100

| TERMS | LINK TABLE INDEX |
|---|---|
| PRINT | 23 |
| PAGE | 24 |
| ⋮ | ⋮ |

FIG.2A

LINK TABLE 23 110

| TOPIC INDEX | PROBABILITY VALUE | FLAG |
|---|---|---|
| 30 | .5 | T |
| 45 | .7 | T |
| ⋮ | ⋮ | ⋮ |
| 47 | .9 | F |
| 50 | .6 | T |
| ⋮ | ⋮ | ⋮ |

FIG.2B

TOPIC TABLE 120

| TOPIC INDEX | TOPIC TITLE | SUBSTITUTION TABLE INDEX |
|---|---|---|
| 30 | "THE..." | AA |
| 45 | "THE..." | BB |
| 50 | "THE..." | CC |
| ⋮ | ⋮ | ⋮ |

FIG.2C

| SUBSTITUTION TABLE INDEX (BB) | | | |
|---|---|---|---|
| LINK TABLE INDEX | REPLACEMENT STRING | LEFT ENDPOINT | RIGHT ENDPOINT |
| 23 | "......" | 10 | 15 |
| 24 | "......" | 4 | 9 |
| ⋮ | ⋮ | ⋮ | ⋮ |

FIG.2D

| SUBSTITUTION META TABLE | |
|---|---|
| TOPIC INDEX | SUBSTITUTION TABLE INDEX |
| 5 | DD |
| 7 | EE |
| ⋮ | ⋮ |
| 45 | BB |

FIG.2E

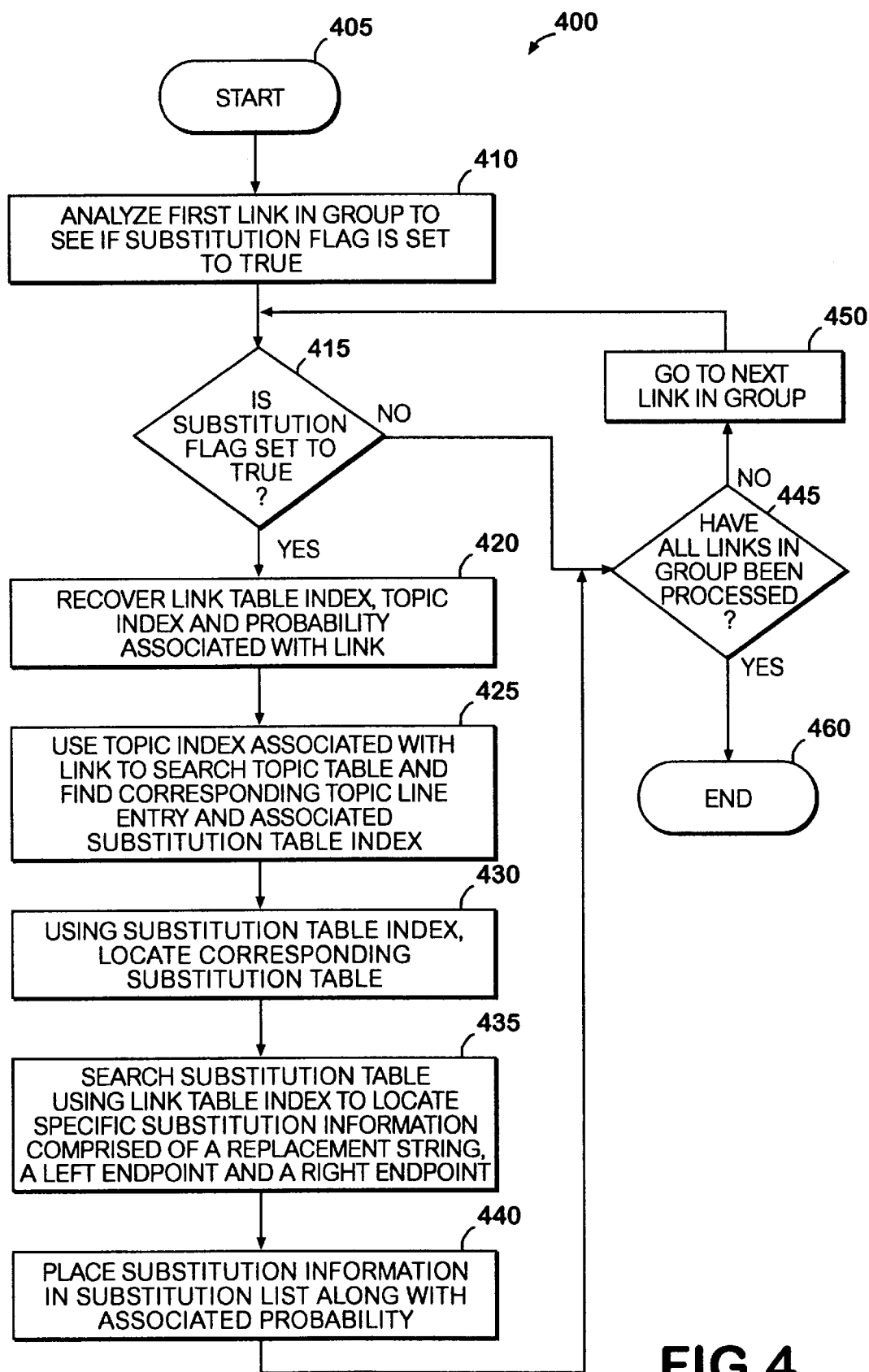

FIG. 6

LINK LIST 150

| LINK TABLE INDEX | TOPIC INDEX | PROBABILITY | FLAG |
|---|---|---|---|
| 23 | 45 | .7 | T |
| 24 | 45 | .9 | T |
| 29 | 45 | .5 | T |
| ... | ... | ... | ... |
| 23 | 50 | .4 | T |
| 24 | 50 | .8 | T |
| 29 | 50 | .7 | T |
| ... | ... | ... | ... |

FIG. 7

SUBSTITUTION LIST FOR TOPIC INDEX (45) 160

| LINK TABLE INDEX | PROBABILITY | REPLACEMENT STRING | RIGHT ENDPOINT | LEFT ENDPOINT |
|---|---|---|---|---|
| 23 | .7 | "......" | 15 | 10 |
| 24 | .9 | "......" | 9 | 4 |
| 29 | .5 | "......" | 3 | 1 |
| ... | ... | ... | ... | ... |

METHOD AND APPARATUS FOR PROVIDING DYNAMIC HELP TOPIC TITLES TO A USER

TECHNICAL FIELD

This invention relates to on-line help topic titles utilized in software application programs and, more particularly, to on-line dynamic help topic titles that are revised based on a search query entered by a user to be more recognizable to the user.

BACKGROUND OF THE INVENTION

In the various types of computer systems currently used today, users often need help in using the application programs provided on the computer systems. Generally, a user is trying to accomplish a specific task within the application program and is having difficulty locating the command or the menu where the command is provided to accomplish the task. Typically, an on-line help feature is provided in the application program where the user can enter a query briefly describing the task which the user is attempting to accomplish. In response to the query, the on-line help feature will typically return to the user a list of topic titles which the user may use to find information to help accomplish the specific task at hand. Generally, the topic titles are fixed in form and are located and accessed using a search engine.

One problem that exists with the help systems currently available today is that the terminology used in the topic titles may differ from the terminology input by the user. Consequently, while the topic title which is on point may in fact be returned in response to the query, the user, not recognizing the terminology, may fail to recognize the topic title which is relevant to the problem at hand. Not seeing the expected terminology, the user may assume the help system did not understand the query or does not contain the needed information. Thus while the search engine may be very efficient in identifying the relevant topic titles, the help system as a whole is inefficient because the user does not recognize the relevant topic title and, as an end result, does not find the help needed to accomplish the desired task.

Another problem adding to the difficulty in the recognition of relevant topic titles by users is that the topic titles are often drafted to cover a broad and general range of tasks. Consequently, the topic titles tend to be generic and lengthy which typically cause users to ignore the topic titles if they fail to recognize some of the first few words in the topic title as being relevant.

Because of these problems that exist with the on-line help features presently available today in the computer/software industry, users continue to experience these difficulties with the on-line help features in application programs. Thus, the on-line help features currently available today continue to inadequately serve the users.

Consequently, there is a need for a system and method for presenting recognizable topic titles to a user in response to a query by a user looking for help in accomplishing a task in an application program. That need is especially keen when dealing with highly task oriented application programs, such as word processing and data manipulation programs. Without the capability of presenting recognizable topic titles to a user in response to a query, the user will have to interpret the generic topic titles currently offered and hope that they select the most relevant ones to investigate further.

In providing a system and method for presenting recognizable topic titles to a user in response to a query, there is a further need for presenting recognizable topic titles to a user that remain short in length after revision. Users tend to spend very little time reviewing the topic titles when they are returned to them. Typically, users tend to review the first few words in a topic title and then make their decision regarding the relevance of the topic title at that point in time. Further, users tend to not read the complete topic titles when the topic titles are lengthy. Thus, the topic titles that are finally presented to the user must be short in length.

In general, there is a need for providing a system and method for presenting recognizable topic titles to a user in response to a query in application programs that provide an on-line help feature, such as for example, word processing and data manipulation oriented programs.

Therefore, in the context of application programs providing for an on-line help feature within, there is a need for the ability to provide recognizable topic titles to a user in response to a query. Additionally, there is a need to provide for the resolution of conflicts that may arise when performing revisions to topic titles to make them more recognizable to users.

SUMMARY OF THE PRESENT INVENTION

The present invention satisfies the above described needs by providing a system and method for presenting recognizable topic titles to a user in response to a query. In one aspect, the system and method of the present invention swaps specified text into the topic titles presented to a user based on whether particular terms were used in the queries. The end result is that the users will be presented with shorter and more readily recognizable topic titles that contain some of the same or similar terminology that was initially used in the queries.

More particularly, the present invention utilizes a search engine that operates in conjunction with a database of links that are weighted and serve to link terms to individual topic titles. Upon receiving a query from a user, the search engine finds all the links in the database that are relevant, creates a link list of all the links located, groups the links in the link list by topic title, determines a weighted relevance for each topic title, and sorts the link list in the order of descending weighted relevance of each topic title. The sorting produces a list of groups of links for specific topic titles arranged in descending order from the most relevant to the least relevant. After forming a link list and sorting according to topic title and relevance, a substitution list is generated for each topic title referenced by links having substitution information attached. Each substitution list includes all the substitution information for all the links referencing the specific topic title.

Along with generating a substitution list for each topic title referenced by the links, the present invention further provides for the detecting and resolving of conflicts among the substitution information in the substitution list. More particularly, in resolving the conflicts, the present invention is directed to substituting into the topic title those replacement strings of text that are associated with the links having the highest probability value associated with the topic title.

In another aspect of the present invention, a computer-readable medium is described on which is stored a computer program for presenting recognizable topic titles to a user in response to receiving a query. The computer program instructions, when executed, analyze the query with a word breaking routine so to determine which terms in the query are substantively representative of the query. After determining the substantively representative terms in the query, the computer program searches a database containing weighted links to topic titles to find all the links referencing link table indices associated with the terms determined from the query. Thereafter, the computer program obtains substitution information associated with the links and generates a substitution list.

From the substitution list, the computer program then detects and resolves conflicts among the substitution information. When all conflicts have been resolved, the computer program proceeds with the revising of the topic titles by way of substituting replacement strings into the topic titles to enhance user recognition. The end result of executing the program instructions is the presenting of a list of the most relevant topic titles to a user. Further, the list of topic titles being presented to the user has been revised in such a manner that the topic titles utilize terminology that is the same as or similar to the terminology contained in the user's initial query. Further, the program instructions, when executed, perform the substitution of replacement strings of text into the topic titles in accordance with individual character positioning.

In yet another aspect of the present invention, a computer system for receiving a query from a user and, in response thereto, presenting the user with recognizable topic titles is provided. The system typically has a processing unit (PU), an input device coupled to the PU, such as a keyboard or a mouse, a pixel-based display device coupled to the PU, a printing device coupled to the PU, and a memory storage device coupled to the PU. In this computer system, the PU is operative to analyze the query with a word breaking routine so to determine which terms in the query are substantively representative of the query. After determining which terms in the query are substantively representative of the query, the PU is operative to search a database containing links that are weighted and serve to link terms to topic titles. All the links referencing the terms determined from the query are then located.

Thereafter, the PU is operative to obtain all the substitution information associated with the links and, from the substitution information, generate a substitution list. In conjunction with the substitution list, the PU is further operative to detect and resolve conflicts among the substitution information. With all conflicts resolved, the PU is then operative to perform revisions on the topic titles by way of substituting replacement strings into the topic titles to enhance user recognition. Once the PU has performed the revisions to the topic titles, the PU is operative to present a list of the topic titles to the user. In the end, the presented list of topic titles is comprised of the most relevant topic titles responsive to the user's query. Furthermore, the topic titles presented to the user have been revised in such a manner that they contain recognizable terminology that is the same as or similar to the terminology used in the user's query. In addition, when the replacement strings of text are substituted into the topic titles, the PU is operative to perform the substitutions in accordance with individual character positioning.

These aspects and other advantages of the present invention will be appreciated from further studying the following detailed description in conjunction with the drawings, as well as the appended claims.

BRIEF DESCRIPTION OF THE DRAWINGS

FIG. 2, consisting of FIGS. 2A–2E, are graphical illustrations of various table structures located in the database utilized in the embodiment of the present invention where:

FIG. 2A illustrates the structure of a keyword table containing various terms and associated link table indices;

FIG. 2B illustrates the structure of a link table comprised of various link line entries, each of which containing a topic index, a probability value and a flag;

FIG. 2C illustrates the structure of a topic table comprised of various topic line entries, each of which containing a topic index, a title string and a substitution table index;

FIG. 2D illustrates the structure of a substitution table having an associated substitution table index, the substitution table being comprised of various substitution line entries, each of which containing a link table index, a replacement string, a left endpoint and a right endpoint; and FIG. 2E illustrates the structure of a substitution meta table that may be utilized in conjunction with an alternative topic table that does not include substitution table indices.

FIG. 3, consisting of FIGS. 3A–3C, are flow diagrams illustrating steps of the embodiment for:

FIG. 4 is a flow diagram illustrating the steps of a method for generating a substitution list in accordance with the embodiment of the present invention.

FIG. 6 is a graphical illustration of the structure of the link list generated in accordance with the embodiment of the present invention.

FIG. 7 is a graphical illustration of the structure of the substitution list generated in accordance with the embodiment of the present invention.

DETAILED DESCRIPTION

Figure 1:
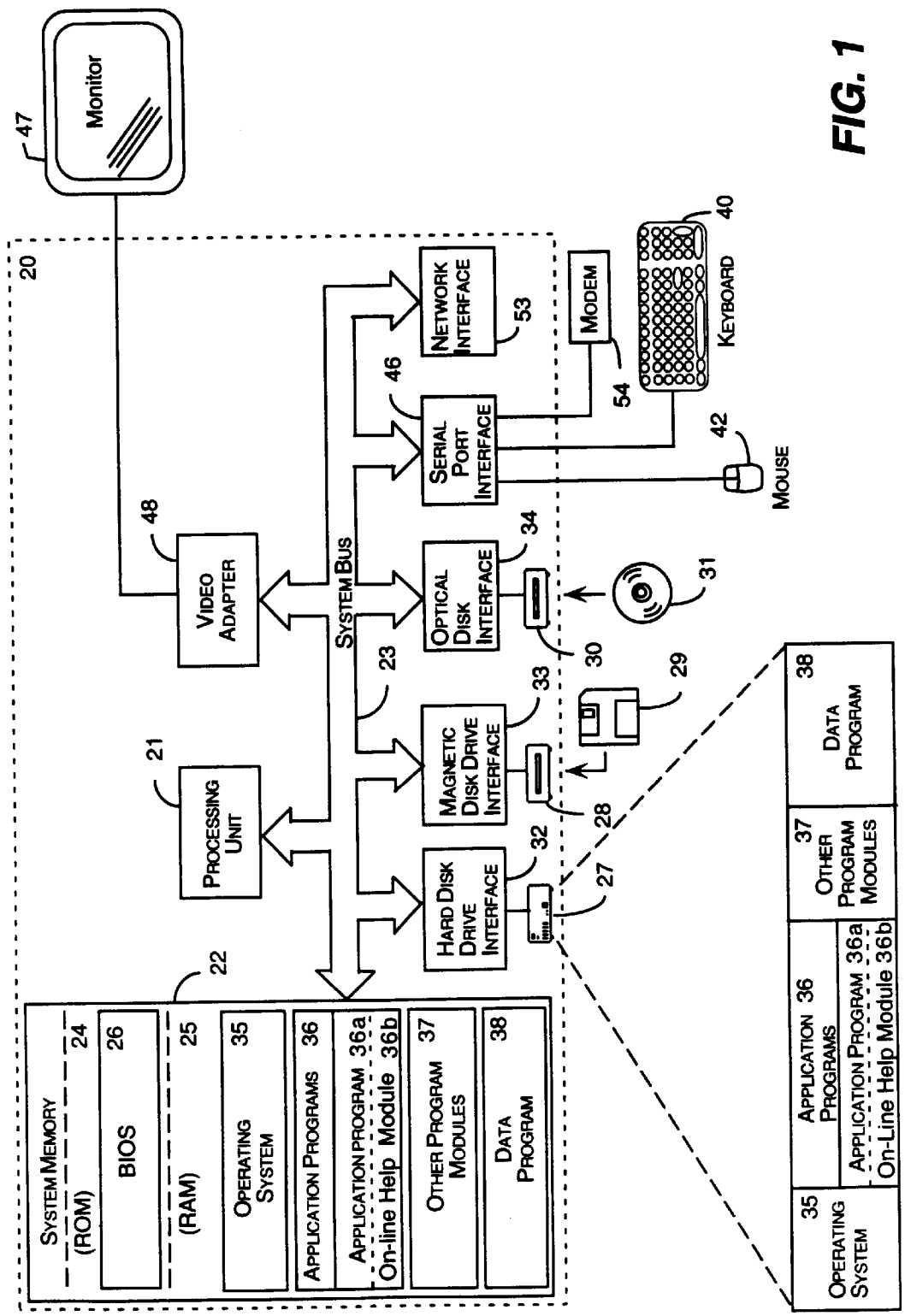
FIG. 1 is a block diagram of a computer system representing the operating environment of an embodiment of the present invention.

The present invention is directed to a system and method for presenting recognizable topic titles to a user in response to receiving a query. An illustrative embodiment of the present invention is incorporated into the on-line help module contained within one or more of the individual application programs developed and marketed by Microsoft Corporation of Redmond, Wash. In general, the present invention is applicable to any application program that provides an on-line help feature.

The present invention allows a user to enter a query into the application program and receive a list of readily recognizable topic titles in response. The topic titles are more recognizable to the user because the topic titles use terms that are the same as or similar to the terms used in the query. This commonality or similarity in the terms is accomplished by performing specific text substitutions on the general topic titles contained in the on-line help module. The capability for performing text substitutions on the topic titles is accomplished by utilizing a database that contains various keyword, link, topic and substitution tables within. The information in the various tables is linked together using various indices which point from one table to another. In conjunction with the various tables in the database, the on-line help module further generates a keyword list, a link list and substitution lists during the processing of the query to aid in determining which topic titles apply to the query, arranging the topic titles in order of weighted relevance, and performing the most relevant text substitutions to the topic titles.

In general, the present invention begins with a word breaking routine being applied to the query to determine which terms in the query might possibly be keyword terms that are substantively representative of the query. The word breaking routine returns a list of the possible keyword terms. The keyword terms in the list are then searched for in the keyword table to find the keyword terms and their associated link table indices. Thereafter, the link table in the database is searched by the link table indices to find all the relevant links linking the keyword terms to all related topic titles. From the all the relevant links found, a link list is generated. Once the link list is formed, the on-line help module sorts the link list by topic title and weighted relevance of each topic title. After the link list is sorted, the top "n" number of relevant topic titles are selected for further processing. Thereafter, a substitution list is generated for each topic title containing all the substitution information associated with each link that relates to the topic title.

The substitution information associated with each link is obtained by locating the appropriate substitution table associated with the topic title. The substitution table is searched according to link table index to find the specific substitution information associated with each link. The substitution lists are then further processed to resolve all possible conflicts between each link with its associated substitution information. The substitution lists result in a list of individual substitutions, in order of weighted relevance, that are to be performed on the topic title. Each substitution list applies to only one specific topic title. After finalizing the substitution lists, the substitutions are performed on the topic titles, and a list of the revised topic titles are presented to the user.

Before describing the database structure and the operation of the on-line help module in greater detail, it is appropriate at this time to first provide a brief description of the general operation of a computer system that is suitable for utilizing the present invention. Although the embodiment of the present invention will be generally described in the context of an on-line help module resident within a word processing application program, implemented on an operating system running on a personal computer, those skilled in the art will recognize that the present invention can also be implemented within various other application programs and on other types of computer systems. Furthermore, those skilled in the art will recognize that the present invention is being implemented in a stand alone computing environment. In a stand alone computing environment, program modules are physically located in local memory storage devices within the computer system and execution of the program modules occurs locally. However, those skilled in the art will also recognize that the present invention could be implemented in a distributed environment such as in a client/server manner.

The detailed description which follows is represented largely in terms of processes and symbolic representations of operations by conventional computer components, including a processing unit (PU), memory storage devices, connected display devices, and input devices. Furthermore, these processes and operations may utilize conventional computer components in a heterogeneous computing environment. Each of these conventional computing components is accessible by the PU via a communication network. The processes and operations performed by the computer include the manipulation of signals by a processor and the maintenance of these signals within data packets and data structures resident in one or more media within memory storage devices.

Generally, a "data structure" is an organizational scheme applied to data or an object so that specific operations can be performed upon that data or modules of data so that specific relationships are established between organized parts of the data structure. A "data packet" is a type of data structure having one or more related fields, which are collectively defined as a unit of information transmitted from one device or program module to another. These data structures impose a physical organization upon the collection of data stored within a memory storage device and represent specific electrical or magnetic elements. Thus, the symbolic representations of operations are the means used by those skilled in the art of computer programming and computer construction to most effectively convey teachings and discoveries to others skilled in the art.

For the purposes of this discussion, a process is generally construed to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, elements, symbols, characters, data, packets, nodes, numbers, points, records, entries, objects, images, files or the like. It should be kept in mind, however, that these and similar terms are associated with appropriate physical objects for computer operations, and that these terms are merely conventional labels applied to physical objects that exist within and during operation of the computer.

It should be understood that manipulations within the computer are often referred to in terms such as issuing, sending, altering, adding, comparing, determining, disabling, displaying, dispatching, placing, reporting, and the like, which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and a suitable operating environment will be described.

The Exemplary Operating Environment

FIG. 1 and the following discussion are intended to provide a brief, general description of the suitable computing environment in which the present invention may be implemented in a computing environment. While the invention will be described in the general context of an on-line help module resident within a word processing application program that runs on an operating system in conjunction with a personal computer, those skilled in the art will recognize that the invention may also be implemented in combination with other types of application programs. Generally, program modules include routines, programs, components (such as stacks or caches), data structures, etc., that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, the program modules may be located in both local and remote memory storage devices.

Referring now to FIG. 1, an exemplary system for implementing the present invention includes a conventional personal computer 20, including a processing unit (PU) 21. In the disclosed embodiment, the PU 21 is in the form of a 80486 or of the family of "PENTIUM" microprocessors manufactured by Intel Corporation of Santa Clara, Calif. However, it should be understood that the invention can be implemented on computers that utilize other types of microprocessors, such as the "MIPS" family of microprocessors from the Silicon Graphics Corporation, the "POWERPC" family of microprocessors from both the Motorola Corporation and the IBM Corporation, the "PRECISION ARCHITECTURE" family of microprocessors from the Hewlett-Packard Company, the "SPARC" family of microprocessors from the Sun Microsystems Corporation, or the "ALPHA" family of microprocessors from the Digital Equipment Corporation.

In describing the details of the personal computer 20 further, the internal make-up of the personal computer 20 includes a system memory 22, and a system bus 23 that couples the system memory 22 to the PU 21. The system memory 22 includes read only memory (ROM) 24 and random access memory (RAM) 25. A basic input/output system 26 (BIOS) is stored in ROM 24. Those skilled in the art will recognize that the BIOS 26 essentially contains the basic routines that help to transfer information between elements within the personal computer 20 during certain computer operations, such as during start-up. However, it should be appreciated that other types of computers may transfer information between elements within the computer without the use of a BIOS 26 and that the invention can readily be implemented in such computers without a BIOS 26. The personal computer 20 further includes a hard disk drive 27, a magnetic disk drive 28 (e.g., that reads from and writes to a removable disk 29), and an optical disk drive 30 (e.g., that reads from an optical disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage for the personal computer 20. Although the description of computer-readable media above includes the hard disk drive 27, a removable magnetic disk 29 and a removable optical disk 31, such as a CD-ROM or DVD, it should be appreciated by those skilled in the art that other types of removable media which are readable by a computer, such as magnetic cassettes, flash memory cards, digital tapes, Bernoulli cartridges, and the like, may also be used in the exemplary operating environment.

The magnetic disk drive 28 and the optical disk drive 30 are also referred to as removable media devices, each having ejection switches (not shown) typically located on their respective front panels. A user typically depresses a drive's ejection switch in order to indicate the user wants to eject media from within the drive. As one skilled in the art will appreciate, each of the removable media devices 28, 30 has an ejection mechanism (not shown) used to eject media 29, 31 from the device.

Although not shown in FIG. 1, the optical disk drive 30 may be a changer type of memory storage device capable of maintaining more than one optical disk 31. An example of such a changer type of memory storage device is a conventional "juke box" type of optical disk drive 30. As a conventional changer device, the optical disk drive 30 may support individual slot load and unload for each removable medium within the drive 30. Alternatively, the optical disk drive 30 may support a cartridge load mechanism where all of the removable media are inserted into a single cartridge before being placed within the drive 30.

Those skilled in the art will understand that program modules and data are provided to the personal computer 20 via one of the local or remote memory storage devices or computer-readable media, which may include the hard disk drive 27, magnetic disk drive 28, optical disk drive 30, RAM 25, ROM 24, a remote memory storage device coupled to the system bus 23 (not shown), and digital tapes (not shown). In the disclosed embodiment, these program modules include an operating system 35, one or more application program modules 36, an application program 36a having an on-line help module 36b resident within, and other program modules 37 for implementing the present invention, and program data 38 used by the various program modules. In the preferred personal computer 20, the hard disk drive 27 and RAM 25 are used to store these program modules once they are installed. However, it is contemplated that program modules and data may also be stored on various types of remote memory storage devices (not shown).

The operating system 35, in conjunction with the BIOS 26 and associated device drivers, provides the basic interface between the computer's hardware and software resources, the user, and program modules, such as application program modules 36. A user may enter commands and information into the personal computer 20 through the use of a keyboard 40 and/or other various input or pointing devices, such as a mouse 42. Other types of pointing devices (not shown in FIG. 1) may include track balls, track pads, joysticks, data gloves, head trackers, and other devices that are suitable for positioning a cursor on a monitor 47. Other input related devices (not shown) may include a microphone, a game pad, a satellite dish, a scanner, or the like. These and other input related devices are often connected to the PU 21 through a serial port interface 46, such as a game port or a universal serial bus (USB). The monitor 47 or other type of display device is also connected to the system bus 23 via an interface, such as a video adapter 48. In addition to the monitor 47, personal computers typically include other peripheral output devices (not shown), such as speakers and printers.

When the personal computer 20 is turned on or reset, the BIOS 26, which is stored in the ROM 24, instructs the PU 21 to load the operating system 35 from the hard disk drive 27 into the RAM 25. Once the operating system 36 is loaded into RAM 25, the PU 21 executes the operating system 35 and causes the visual elements associated with the user interface of the operating system 35 to be displayed on the monitor 47.

The personal computer 20, may also operate in a networked environment using logical connections to one or more remote programmable devices, such as a remote computer (not shown). The remote computer may be a server, a router, a peer device, or other common network node. Typically, the remote computer includes many or all of the elements described above relative to the personal computer 20. Logical connections that can be utilized may include a local area network (LAN) (not shown) and a wide area network (WAN) (not shown). Such networking environments are commonplace in offices, enterprise-wide computer networks, intranets and the global Internet.

When used in a LAN networking environment, the personal computer 20 is typically connected to the local area network through a network interface (not shown). When used in a WAN networking environment, the personal computer 20 typically includes a modem 54 or other means for establishing communications over the wide area network (not shown), such as the global Internet. The modem 54, which may be internal or external, is connected to the system bus via the serial port interface 46. In a networked environment, program modules depicted relative to the personal computer 20, or portions thereof, may be stored in the hard disk drive 27.

Although other internal components of the personal computer 20 are not shown, those of ordinary skill in the art will appreciate that such components and the interconnection between them are well known in the art. Accordingly, additional details concerning the internal construction of the personal computer 20 need not be disclosed in connection with the present invention.

As previously mentioned, an embodiment of the present invention is found in the on-line help module 36b resident within the application program 36a, which is designed to operate in conjunction with Microsoft Corporation's "WINDOWS 95" or "WINDOWS NT" operating systems. However, it should be understood that the invention can be implemented for use with other operating systems including, but not limited to, Microsoft Corporation's "WINDOWS 3.1" operating system, IBM Corporation's "OS/2" operating system, and the operating system used in "MACINTOSH" computers manufactured by Apple Computer, Inc.

It should be appreciated that operating systems, such as the "WINDOWS 95" and "WINDOWS NT" operating systems, are quite complex and provide a wide variety of services that allow users and programs to utilize the resources available in the personal computer. Those skilled in the art will be familiar with operating systems and their various features. For more comprehensive information regarding the "WINDOWS 95" and "WINDOWS NT" operating systems and their interaction with programs, the reader may refer to any of a variety of publications, including the "Win32 Programmer's Reference" and "Advanced Windows", both published by Microsoft Press.

Likewise, those skilled in the art will appreciate that the preferred embodiment of the present invention provides a wide variety of features and functions in addition to those included in the brief description presented above.

The On-Line Help Module

Figure 3A:
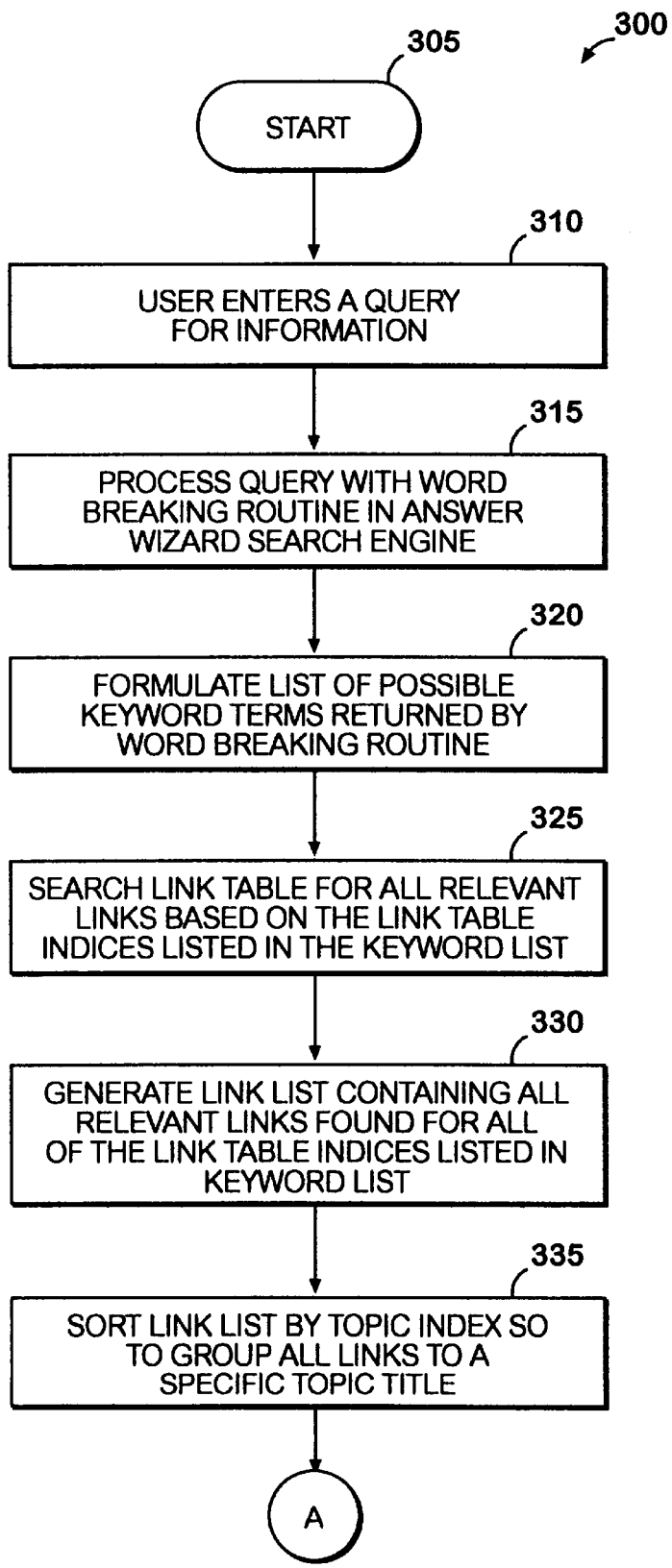
FIG. 3A, entering a query, processing the query, formulating a list of possible keyword terms, searching the link table, and generating and sorting a link list.
Figure 3B:
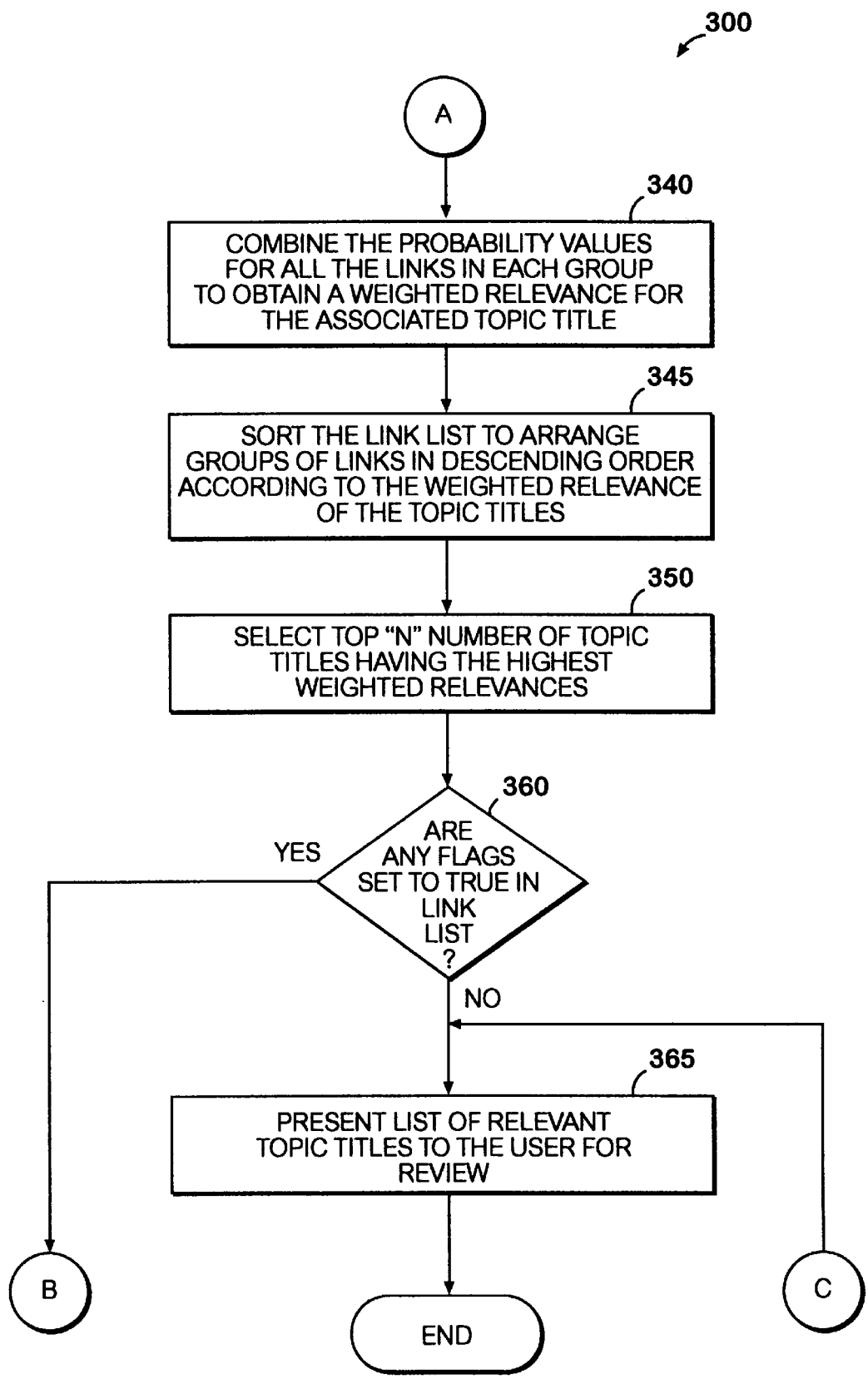
FIG. 3B, combining probability values of links in each group to obtain weighted relevances to topic titles, sorting the link list according to topic title weighted relevances, selecting a top "n" number of topic titles, determining if any links have flags set to true, and presenting a revised list of topic titles to the user.
Figure 3C:
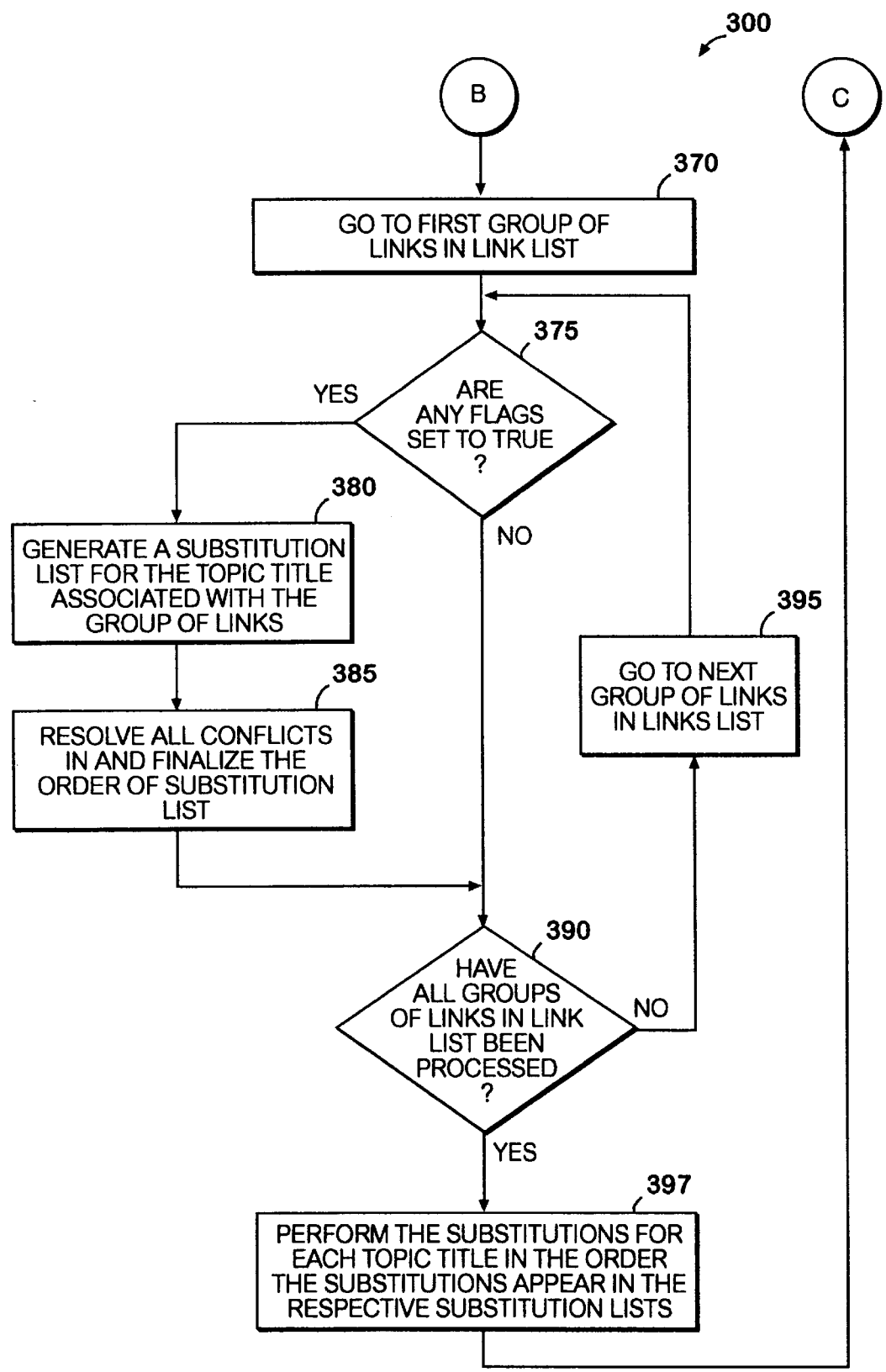
FIG. 3C, determining if any flags are set to true in the first group of links in link list, generating a substitution list for that group of links, resolving conflicts and finalizing the order of the substitution list, repeating the same for each group of links in the link list, and performing the substitutions on the topic titles in the order the substitution information appears in the substitution list.

Turning now to FIGS. 2A–2E, 3A–3C, and FIGS. 4–7, an embodiment of the present invention is described. The on-line help module 36b utilizes a search engine and a database contained within the on-line help module 36b. FIGS. 2A–2E are graphical illustrations of various table data structures located in the database. FIGS. 3A–3C are flow diagrams illustrating the steps of the embodiment for accomplishing the presentation of recognizable topic titles to a user in response to receiving a query. The various steps are illustrated showing the method implemented by the on-line help module 36b resident within the application program 36a and located in system memory 22. First, the database structure will be discussed in detail. Thereafter, the operation and primary flow of the on-line help module 36b will be addressed in detailed. In addition, the generation of substitution lists and the conflict resolution procedure performed within the substitution lists will be discussed in detailed.

The Database Structure

In referring now to FIGS. 2A–2D, graphical illustrations of the various table data structures located within the database are shown. The database resident within the on-line help module 36b is generally comprised of a keyword table 100, a link table 110, a topic table 120 and a multiplicity of substitution tables 130. It is to be noted that the table data structures depicted in FIGS. 2A–2E are exemplary structures illustrating one embodiment of the linking and organization of the information in the database. Those skilled in the art will recognize that various other structures can be employed within the database to achieve the data associations and linking necessary to accomplish the present invention. For example, many of the columns of data in the tables could be in the form of separate single column tables linked to each other with additional appropriate indices, such as is illustrated in FIG. 2E where a substitution meta table 140 is depicted. In general, the substitution meta table 140 is a separate additional data table that can be used for associating the substitution table indices 126 with the corresponding topic indices 114. The substitution meta table 140 provides an alternative data arrangement as compared to including the substitution table indices 126 directly in the topic table 120 as illustrated in FIG. 2C. Specifically, the substitution meta table 140 includes various meta line entries 141. Each individual meta line entry 141 includes a topic index 114 and a corresponding substitution table index 126. For the purpose of describing one embodiment of the present invention in detail, the detailed description to follow will utilize the structure of the topic table 120 illustrated in FIG. 2C.

In FIG. 2A, the keyword table 100 is shown having keyword line entries 102. Each keyword line entry 102 includes a term 104 and a link table index 106 to be associated with the term 104. The link table indices 106 in the disclosed embodiment are in the form of a two digit number. The keyword table 100 is basically a library of all the proposed terms that a user may utilize in a query. This keyword table 100 of individual terms 104 is generated and determined by the editors of the on-line help module 36b who have expertise in how customers typically use terms.

The keyword table 100 is linked into the link table 110 (FIG. 2B) by the link table indices 106. In referring to FIG. 2B, the link table 110 can be seen to include numerous link line entries 112, also generally referred hereinafter as links 112. Each link line entry 112 includes and associates a topic index 114, a probability value 116, and a flag 118 with the link table index 106. Each link line entry 112 represents one complete specific link. The topic index 114 is typically in the form of a reference number and the flag 118 is typically in the form of a bit used to signify whether any substitution information is associated with that specific link. It is noted that the links 112 could alternatively have the substitution information attached directly to each individual link 112. However, this arrangement has the disadvantage of requiring a greater amount of memory to store the data and operate efficiently. Hence, the database structure described and utilized herein has the substitution information arranged in separate individual tables that are described in more detail later.

It can be seen from FIG. 2B that one link table index 106 may have numerous link line entries 112 associated with it. This, in effect, provides the ability to associate a particular term 104 with multiple topic indices 114. In addition, the probability value 116 in the disclosed embodiment is in the form of a numerical value within the range from zero (0) to one (1) such as, for example, 0.3, 0.5, 0.8, etc. The probability value 116 represents a degree of weighted relevancy between the term 104 and a particular link 112. This degree of weighted relevancy is predetermined for each link 112 by the editors of the on-line help module 36b. The editors of the on-line help module 36b assign a probability value 116 to each of the links 112 based on their expertise with the terminology typically used by customers in the industry.

The link table 110 is linked into the topic table 120 (FIG. 2C) by the topic index 114. From FIG. 2C, the topic table 120 can be seen to include numerous topic line entries 122 arranged one after another. Each topic line entry 122 includes and associates a topic index 114, a topic title 124 and a substitution table index 126. It is to be noted that the topic indices 114 shown in the topic table 120 are implicit due to merely being the actual positions that the topic line entries 122 appear in the topic table 120 rather than separately listed values. For example, the search engine needs only to point to the position of a specific topic line entry 122 in the topic table 120 in order to obtain the necessary information associated with a specific topic title 124 listed in the topic table 120. Therefore, for example, the number forty-five (45) depicted in FIG. 2C represents the forty-fifth (45th) topic line entry 122 listed in the topic table 120. In addition, there is only one topic line entry 122 contained in the topic table 120 for each topic title 124. Thus, there is also only one substitution table 130 for each topic title 124. The topic titles 124 are comprised of a character string forming a phrase relating to information on a task, action or topic offered to the user.

The substitution table index 126 located in each topic line entry 122 serves to link the topic title 124 specifically with an associated substitution table 130 (FIG. 2D). In FIG. 2D, the substitution table 130 can be seen to include numerous substitution line entries 132 arranged one after another in a column. Each substitution line entry 132 contains the necessary substitution information for performing a substitution on the associated topic title 124. Each substitution line entry 132 is comprised of a link table index 106, a replacement string 134, a left endpoint 136, and a right endpoint 138. Generally, there can be only one substitution line entry 132 contained within a substitution table 130 for a specific link table index 106. The substitution table 130 is searched by the link table indices 106 to locate the appropriate replacement string 134 for the associated topic title 124. The replacement string 134 consists of the actual text to be substituted into the associated topic title 124.

In general, the present invention involves the swapping out of text in topic titles 124 such that some terminology is removed and some terminology relating to the terminology input by the user is substituted in. As for the positioning of the replacement strings 134 in the topic titles 124, the left and right endpoints, 136 and 138 respectively, determine the specific positioning on an individual character basis. For example, the left and right endpoints, 136 and 138, are typically in the form of numerical values representing the actual beginning and ending character positions within the associated topic title 124 where the replacement string 134 is to be substituted.

In short, the database is formed from various table data structures which function collectively to associate specific pieces of information with each other and with certain selected terms 104 used in the query of a user. It is to be understood that those skilled in the art will recognize other data arrangements and associating schemes that can be implemented to accomplish the same information linking necessary to practice the present invention with equal success.

The overall description of the database structure and organization as described above will be further understood when viewed in conjunction with the operation and primary flow of the on-line help module 36b described below.

Operation and Primary Flow

Referring now to FIGS. 3A–3C, the preferred method 300 for the primary flow of the on-line help module 36b is illustrated. The primary flow of the on-line help module 36b begins in the preferred method 300 at step 305. From step 305, the method 300 proceeds to step 310 where the user enters a query for information. After the user has entered a query, the method 300 processes the query with a word breaking routine within the search engine, at step 315. The word breaking routine employed by the search engine is that of a standard word breaking routine commonly used in the software industry. From step 315, the method 300 proceeds to formulate a keyword list (not shown) of possible keyword terms returned by the word breaking routine, at step 320. The keyword list consists of discrete, meaningful terms 104 selected from the query and determined to be substantively representative of the query. Additionally, the keyword list generated at step 320 also contains the link table indices 106 associated with each of the terms 104. Once the keyword list is generated at step 320, the method 300 continues to step 325. At step 325, the link table 110 is searched by the search engine to locate all relevant links based on the link table indices 106.

After searching the link table 110 at step 325, the method 300 proceeds to step 330. At step 330, a link list 150 (see FIG. 6) is generated that contains all the relevant links 112 found in the link table 104 relating to each of the link table indices 106 listed in the keyword list. Typically, after completion of step 330, the link list 150 is arranged such that the individual link line entries 112, also referred to herein as the links 112, are arranged in groupings which correspond to each associated topic title 124. The arrangement of the link list 150 will generally be in the form depicted in FIG. 6 which will be discussed in more detail at a later time. At this point, the link list 150 has been generated, and now sorting is required. Therefore, at step 335, the link list 150 is sorted by topic index 114 so to group together all links 112 according to specific topic titles 124. From step 335, the method 300 proceeds on to step 340, as illustrated in FIG. 3B.

In referring to FIG. 3B, at step 340 the method 300 now continues with the combining of the probability values 116 for all the links 112 contained within each sorted group to obtain a weighted relevance for each associated topic title 124. Once a weighted relevance for each of the associated topic titles 124 has been determined, the method 300 proceeds to step 345. At step 345, the link list 150 is again sorted to arrange the groups of links 112 in a descending order according to the weighted relevance of the associated topic title 124. Therefore, at this point, the groups of links 112 in the link list 150 are arranged from the most relevant associated topic title 124 to the least relevant associated topic title 124. After step 345, the method 300 continues to step 350 where the top "n" number of groups of links 112, having the highest weighted relevances for their respective associated topic titles 124, is selected for further processing. Next, the method 300 checks to see if any substitution information is associated with any of the links 112.

At step 360, the sorted link list 150 is analyzed to determine whether any flags 118 are set to true. The flags 118 are data bits associated with each link 112 utilized to indicate whether substitution information is associated with the link 112. If the link 112 has substitution information associated with it, a "true" flag 118 will be associated with the link 112. If, at step 360, no true flags 118 are present, the method 300 follows the "no" branch to step 365. At step 365, the method 300 presents the list of topic titles 124 to the user in the order that the groups of links 112 associated with the topic titles 124 are arranged in the link list 150. At this point, no replacement strings 134 were applicable to any of the topic titles 124 deemed relevant to the user's query. If, however, at step 360, some true flags 118 are present, the method 300 implemented by the on-line help module 36b follows the "yes" branch to step 370 in FIG. 3C.

In referring now to FIG. 3C, the substitution information collecting aspect of the method 300 begins at step 370. At step 370, the method 300 positions itself at the first group of links 112 in the link list 150. Next, at step 375, the method 300 analyzes the group of links 112 and determines whether any true flags 118 are present. If, at step 375, at least one true flag 118 is present, the method 300 follows the "yes" branch to step 380. At step 380, a substitution list 160 (FIG. 7) is generated for the topic title 124 associated with the group of links 112. The substitution list 160 will be described in further detail below in conjunction with FIGS. 5 and 7. After the substitution list 160 is completed at step 380, the method 300 continues to step 385 where all conflicts within the substitution list 160 are resolved. As with the substitution list 160, the details of the conflict resolution procedure will also be described in further detail below in conjunction with FIGS. 5 and 7. After step 385, the method 300 then proceeds on to step 390. Alternatively, if, at step 375, no true flags 118 are present, the method 300 follows the "no" branch directly to step 390.

At step 390, the method 300 determines whether all the groups of links 112 in the link list 150 have been processed. If all the groups of links 112 have been processed, the method 300 follows the "yes" branch to step 397. At step 397, the substitutions for each topic title 124 are performed in the order the substitutions appear in the respective substitution lists 160. However, if, at step 390, all the groups have not been processed, the method 300 follows the "no" branch on to step 395. At step 395, the method 300 proceeds to analyze the next group of links 112 listed in the link list 150. Thereafter, the method 300 returns to step 375 and repeats the process until all the groups of links 112 in the link list 150 have been processed.

After the completion of step 397, all the groups of links 112 in the link list 150 have been processed, and all the substitutions have been performed on the associated topic titles 124. Next, as illustrated in FIGS. 3B and 3C, the method 300 returns to step 365 where the list of topic titles 124 is presented to the user for review. The topic titles 124 presented to the user are notably arranged in an order according to their associated weighted relevance, with the most relevant topic title 124 being listed first and the least relevant topic title 124 being listed last. Moreover, the topic titles 124 presented to the user at step 365 have been revised to be more recognizable to the user due to specific replacement strings 134 having been substituted into the topic titles 124.

Now that the overall operation and primary flow of the on-line help module 36b has been described in detail with particularity to the individual steps within the preferred method 300, the operation and flow of the generation of substitution lists 160 and the conflict resolution procedure will be discussed in further detail.

Generation of the Substitution Lists

In referring now to FIG. 4, a flow diagram illustrates the operation and primary flow of the method 400 implemented for generating the substitution lists 160 initiated at step 280 in FIG. 2C. The method 400 starts at step 405 and proceeds to step 410, where the first link 112 within the first group in the link list 150 is analyzed. From step 410, the method 400 proceeds to step 415 where it is determined whether the flag 118 is set to true.

Generally, if a link 112 has substitution information associated with it, the link 112 will have a "true" flag 118. Now if, at step 415, the flag 118 is set to true, method 400 follows the "yes" branch on to step 420. At step 420, method 400 recovers the link table index 106, the topic index 114 and the probability value 116 associated with the link 112. With the recovered indices 106 and 114, and the probability value 116, method 400 proceeds to step 425. At step 425, the topic index 114 associated with the link 112 is used to binary search the topic table 120 to locate the topic line entry 122 that includes the associated substitution table index 126 and associated topic title 124. Next, as illustrated at step 430, method 400 uses the substitution table index 126 to locate the corresponding substitution table 130 associated with the specific topic index 114 that was recovered in step 420. At step 435, the substitution table 130 is then binary searched using the link table index 106 that was recovered in step 420 to locate the specific substitution information. The substitution information, as described previously with reference to FIG. 2D, is generally comprised of the replacement string 134, the left endpoint 136 and the right endpoint 138. From step 435, the method 400 then proceeds to generate a substitution list 160 by placing the substitution information, along with the probability value 116 that was recovered in step 420, into the substitution list 160 thereby forming a substitution line entry 132.

After obtaining the substitution information associated with the first link 112 through implementing steps 410–440, the method 400 then proceeds to step 445. At step 445, method 400 determines whether all the links 112 in the respective group have been processed. If, at step 445, not all the links 112 in the group have been processed, method 400 will follow the "no" branch on to step 450. At step 450, the next link 112 in the group is then analyzed and the method 400 returns to step 415. Thereafter, steps 415–450 are repeated in a similar fashion as described above until it is determined, at step 445, that all links 112 in the group have been processed. If, at step 445, it is finally determined that all links 112 in the group have been processed, the method 400 follows the "yes" branch on to step 460 where method 400 ends and returns to step 385 in FIG. 3C. Upon the completion of method 400, a substitution list 160 is generated having various substitution line entries 132, each of which comprises specific substitution information to be applied to the associated topic title 124.

Once all the substitution information has been obtained and placed in the substitution list 160 for all the links 112 in the group, the substitution list 160 undergoes a conflict resolution procedure as called for in step 385 in FIG. 3C. Thereafter, the method 300 continues, as described previously, by repeating steps 375–395 until all groups of links 112 in the link list 150 have been processed.

Conflict Resolution Procedure

Figure 5:
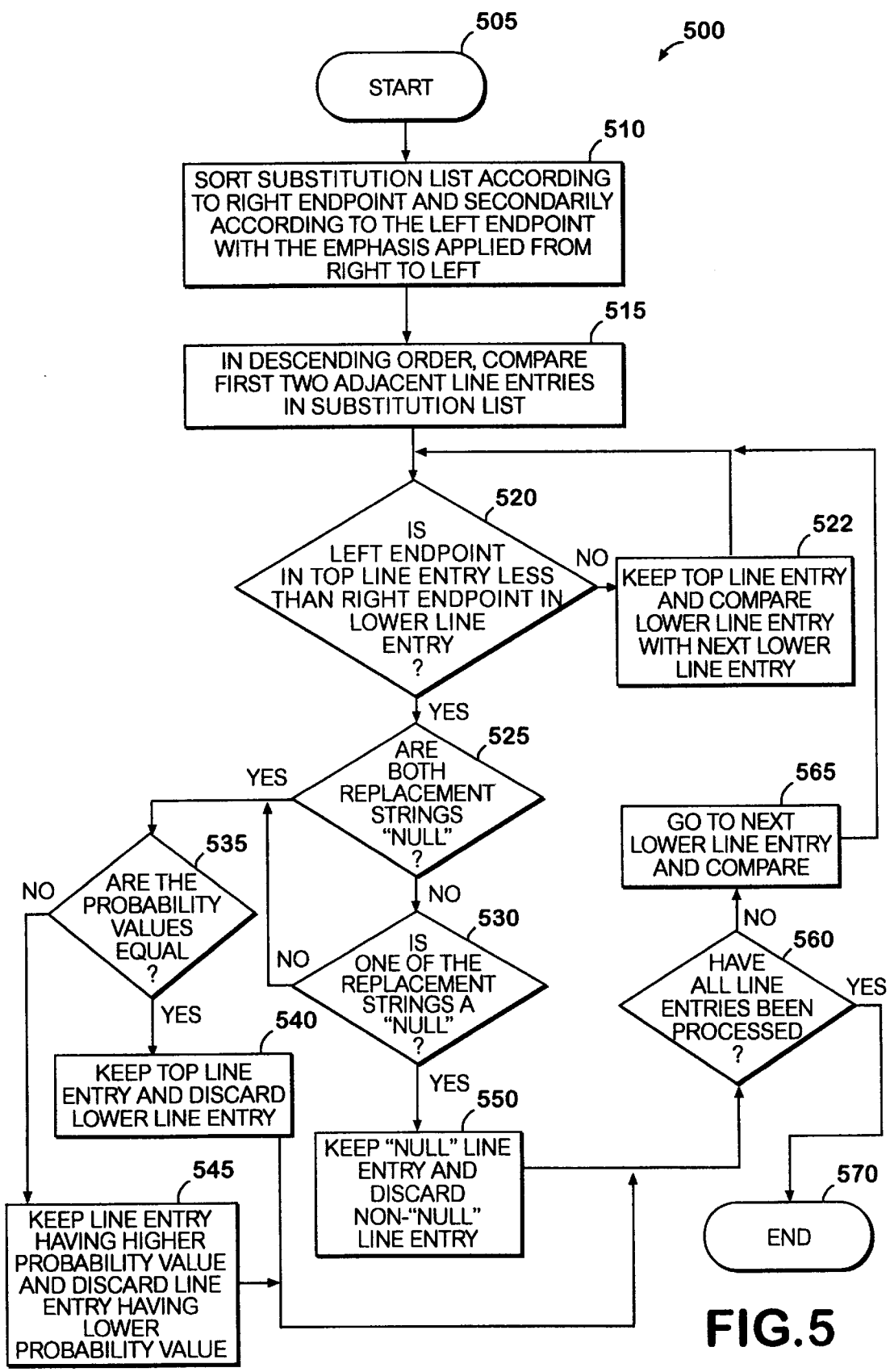
FIG. 5 is a flow diagram illustrating the steps of a method for resolving conflicts among the substitution information contained in the substitution lists associated with the topic titles in accordance with the embodiment of the present invention.

In referring now to FIG. 5, a flow diagram illustrates the operation and primary flow of a method 500 which is employed for resolving the conflicts in and finalizing the order of the substitution list 160 as called for by step 385 in FIG. 3C. The method 500 starts at step 505 and proceeds to step 510. At step 510, the method 500 first begins sorting the substitution list 160 according to the right endpoint 138 included within the substitution information contained within each individual line entry 162 listed in the substitution list 160. The right endpoints 138 are sorted with emphasis being applied from right to left. Emphasis applied in this manner will give priority to the replacement strings 134 which are to be substituted in the farthest right positions of the associated topic titles 124. Thus, for example, a replacement string 134 having associated with it a right endpoint 138 equal to 10 will take priority over another replacement string 134 having associated with it a right endpoint 138 equal to 8. The replacement strings 134 are sorted with such right to left emphasis so to remove any possibilities of having replacement strings 134 overlap one another when substituted into the topic titles 124.

Additionally, step 510 secondarily sorts the substitution list 160 according to the left endpoints 136 when, during comparisons, the right endpoints 138 associated with two individual line entries 162 are equal. Therefore, if the right endpoints 138 included within two compared line entries 162 are equal, the left endpoints 136 are then compared to determine which line entry 162 takes priority over the other. Again, emphasis is applied from right to left when comparing the left endpoints 136. The end result of sorting the substitution list 160, in the manner dictated by step 510, is that the substitution list 160 is arranged in a descending order such that the first replacement string 134 substituted into the associated topic title 124 will be the farthest right positioned substitution within the topic title 124. Then, the next lower replacement string 134 listed in the substitution list 160 is to be substituted into the topic title 124 to the left of the first substitution, and so forth thereafter.

After initially sorting the substitution list 160 in descending order with emphasis applied from the right to the left, the method 500 proceeds to step 515. At step 515, the first two adjacent line entries 162 are compared in descending order to one another. At step 520 the method 500 determines whether the left endpoint 136 contained in the top line entry 162 is less than the right endpoint 138 contained in the lower line entry 162. If, at step 520, the left endpoint 136 of the top line entry 162 is determined to be greater than the right endpoint 138 of the lower line entry 162, the method 500 follows the "no" branch on to step 522. At step 522, the method 500 keeps the top line entry 162 and proceeds to compare the lower line entry 162 with the next lower line entry 162 listed in the substitution list 160. Thereafter, the method 500 returns to step 520 and continues as previously described above.

Alternatively, if, at step 520, the left endpoint 136 is less than the right endpoint 138, then the method 500 follows the "yes" branch on to step 525. At step 525, the method 500 determines whether both replacement strings are "null". A "null" is a specific replacement string 134 that indicates that the term 104 for which the link 112 associated with the topic title 124 is a term that is already present in the topic title 124. In this instance, the "null" replacement string 134 dictates that no substitution is to be performed for that specific term 104. Now, at step 525, if both replacement strings 134 are both "null", then the method 500 continues to step 535 where it is determined whether the probability values 116 associated with the line entries 162 are equal. If, at step 535, the probability values are equal, the method 500 follows the "yes" branch on to step 540. At step 540, the top line entry 162 is kept in the substitution list 160 and the lower line entry 162 is discarded. Thereafter, the method 500 proceeds on to step 560.

Alternatively, if, at step 535, the probability values 116 are not equal, then the method 500 follows the "no" branch on to step 545. At step 545, the method 500 keeps the line entry 162 having the higher probability value 116 and discards the line entry 162 having the lower probability value 116. Thereafter, the method 500 proceeds to step 560.

If, however, at step 525, the replacement strings 134 are not both "null", then method 500 follows the "no" branch on to step 530. At step 530, it is determined whether only one of the replacement strings 134 is "null". If neither replacement string is "null", then method 500 follows the "no" branch to step 535. Thereafter, method 500 proceeds as previously described through steps 535, 540, 545, and finally to 560. Alternatively, if, at step 530, one of the replacement strings is "null", then method 500 follows the "yes" branch on to step 550. At step 550, the method 500 keeps the "null" line entry 162 and discards the "non-null" line entry 162. Thereafter, method 500 proceeds on to step 560.

Once method 500 has operated on the line entries 162 in accordance with the actions illustrated in either of the steps 540, 545, or 550, method 500 continues to step 560. At step 560, it is determined whether all the line entries 162 in the substitution list 160 have been processed. If, at step 560, all the line entries 162 have not been processed, then method 500 follows the "no" branch to step 565. At step 565, the next lower line entry 162 is compared to the closest upper line entry 162 in the substitution list 160. In general, adjacent line entries 162 are continually compared to one another in such fashion within the substitution list 160 until all the conflicting line entries 162 having the least priority are discarded. If, at step 560, it is determined that all the line entries 162 have been processed, the method 500 proceeds to step 570 and ends.

After completing the method 500, the substitution list 160 results in a list of specific substitutions that are: 1) the most relevant to the user's query; and 2) arranged such that all the substitutions will begin at the right and continue toward the left of the topic title 124 without having any conflicts arising with the substitutions.

In referring now to FIG. 6, a graphical illustration of an exemplary embodiment of the general structure of a link list 150 generated during the operation of the present invention is shown in detail. It can be seen from FIG. 6 that the link list 150 comprises the various identical link line entries 112 as are contained within the link table 110. The link line entries 112 are copied to the link list 150 when identified as being relevant during the initial search in the link table 110 by link table index 106. Each link line entry 112 contains a link table index 106, a topic index 114, a probability value 116 and a flag 118. It can further be seen from FIG. 6 that multiple link line entries 112 may be contained in the link list 150 referencing the same topic index 114. This is due to possibly having more than one term 104 linked to the same topic title 124. FIG. 6 further illustrates the grouping of the link line entries 112 according to topic index 114.

In referring now to FIG. 7, a graphical illustration of an exemplary embodiment of the general structure of a substitution list 160 generated during the operation of the present invention is shown. The substitution list 160 can be seen to include various line entries 162. Each line entry 162 includes a link table index 106, a probability value 116, a replacement string 134, a right endpoint 138, and a left endpoint 136. It can further be seen, from FIG. 7, that the line entries 162 are arranged in order of right endpoint 138 with emphasis from right to left.

Accordingly, the present invention provides for the presenting of short, readily recognizable topic titles 124 to a user in response to a query by swapping replacement strings 136 into individual topic titles 124 based on whether particular terms 104 were used in the queries.

In further explanation of the operation of the present invention, an example of method 300 being implemented on a query is now described in detail. For example, if a user were to submit a query such as "Print a page sideways," the word breaking routine would select the terms 104 "print" and "sideways" to be the substantively representative terms in the phrase. From the word breaking routine, a list of the possible keyword terms 104 "print" and "sideways" is returned. The keyword terms 104 in the list are then searched for in the keyword table 100. Once the keyword table 100 is searched and the terms 104 "print" and "sideways" are located, the respective link table indices 106 for the terms 104 "print" and "sideways" are retrieved. The link table indices 106 for the terms 104 "print" and "sideways" are then used to search the link table 110 for all the links 112 linking the terms 104 to relevant topic titles 124. With the links 112 located in the link table 110, a link list 150 is then formed containing all the information in each link 112 that was located. The link list 150 is then sorted into individual groups according to referenced topic title 124, a weighted relevance of the referenced topic title 124 of each group is determined, and the groups of links are sorted again according to the overall weighted relevance of the topic titles 124. Thus, the link list 150 results in a number of individual groups of links 112 being arranged by group according to the weighted relevance of the topic titles 124.

From the sorted link list 150, each group of links 112 is analyzed, one link at a time, to see if any substitution information is attached. If so, then a substitution list 160 is generated for the referenced topic title 124 and the attached substitution information is retrieved from the substitution table 130 associated with the topic title 124 and listed therein. The substitution list 160 then has a line entry 162 listed within containing the substitution information. For this example, assume that the substitution information includes the link table index 106 for the term 104 "sideways", the probability value 116 associated with the term 104 "sideways" and its relevance to the topic title 124, the replacement string 134 "sideways", the left endpoint 136 of 17, and a right endpoint 138 of 33. The left and right endpoints 136 and 138 of 17 and 33 respectively are indicators of specific individual character positions within the topic title 124. For instance, the topic title 124 of "Printing a page in landscape mode" has the string "in landscape mode" occupying the character positions 17 through 33. After the substitution list 160 having the line entry 162 for the term 104 "sideways" is sorted and complete, the substitution is then performed on the topic title 124. Although this example involves only one entry line 162 for simplicity sake, other queries may have more than one entry line 162 in the substitution list 160 wherein sorting and conflict resolution tasks would further be performed on the substitution list 160.

In performing the final substitution, the characters occupying positions 17 through 33 in the topic title 124, namely the string of "in landscape mode", are then removed from the topic title 124. In place of characters 17 through 33, the replacement string 134 of "sideways" is substituted therein. The resulting topic title after being revised then reads as "Printing a page sideways." Thus, the newly revised topic title 124 that gets presented to the user utilizes the same or similar terminology initially entered in the query. Hence, the user will immediately recognize the topic title 124 as being relevant to his query and will not have to guess whether the topic title 124 is really where the desired information is located.

In further explanation of the operation of the present invention, an example of the method 500 being implemented on a substitution list 160 is now described in detail. For example, assume that the first line entry 162 in a substitution list 160 is comprised of a link table index 106, a probability value 116, a replacement string 134, a left endpoint 136, and a right endpoint 138 such as 23, 0.8, "printing", 12, and 20 respectively. Further, for example, assume that the second line entry 162 in a substitution list 160 includes 25, 0.6, "multiple", 5, and 13 respectively. Now when the conflict resolution procedure of method 500 is implemented, the substitution list 160 will be sorted according to the right endpoints 138 from right to left. Thus, since in the first line entry 162 the right endpoint 138 is 20 and in the second line entry 162 the right endpoint 138 is 15, the first two line entries 162 are in proper order with the second line entry 162 being below the first line entry 162 and giving emphasis from right to left. In a substitution list 160 that had more line entries 162, the method 500 would continue to sort all the line entries 162 in a similar manner.

Next, the left endpoint 136 of the first line entry 162 is compared to the right endpoint 138 of the second line entry 162 to see if there is an overlap. An overlap occurs if the right endpoint 138 in the second line entry 160 is greater than the left endpoint 136 in the first line entry 162. Since the right endpoint 138 of the second line entry 162 is 13 and the left endpoint 136 of the first line entry 162 is 12, the replacement strings 134 overlap. With the first two line entries 162 having overlapping substitution information, the method 500 then looks to see if any of the associated replacement strings 134 are "null" strings. Since none of the replacement strings are "null" strings, the method 500 then looks to the probability values 116 to determine which replacement string 134 is to be discarded. In this example, the first line entry 162 has a greater probability value 116 of 0.8, as compared to the 0.6 associated with the second line entry 162. Therefore, the second line entry 162 is discarded. In short, only the first line entry 162 remains to have its replacement string 134 substituted into the topic title 124. The method 500 then proceeds to compare the retained first line entry 162 with the next lower adjacent line entry 162 (in this example, the third line entry 162) in the substitution list 160 in such similar fashion until no overlapping replacement strings remain in the substitution list 160.

The present invention provides a system and method for presenting recognizable topic titles to a user in response to a query entered into an on-line help feature in an application program. In one aspect, the system and method of the present invention swaps specified text into the topic titles presented to a user based on whether particular terms 104 were used in the queries. The end result is that the users will be presented with shorter and more readily recognizable topic titles 124 that contain some of the same or similar terms 104 that were initially used in their queries.

More particularly, the present invention utilizes a search engine that operates in conjunction with the database of various table data structures containing links 112 that are weighted and that serve to link terms 104 to individual topic titles 124. Upon receiving a query from a user, the search engine finds all the links 112 in the database that are relevant, creates a link list 150 of all the links 112 located, groups the links 112 within the link list 150 by topic title 124, determines a weighted relevance for each topic title 124 and sorts the groups of links 112 by descending weighted relevance of each specific topic title 124 associated with each group. The groups of links 112 in the link list 150 result in a descending order from most relevant to least relevant.

After forming the link list 150 having the links 112 listed within arranged in groups and according to the descending weighted relevance of the associated topic titles 124, a substitution list 160 is generated for each topic title 124 referenced by links. Each substitution list 160 includes all the substitution information for all the links 112 referencing a specific topic title 124.

Along with generating a substitution list 160 for each topic title 124 referenced by the links 112, the present invention further provides for a system and method for detecting and resolving conflicts among the substitution information in the substitution list 160. After resolving the conflicts in the substitution lists 160, the topic titles 124 are revised and then presented to the user.

An important aspect of the present invention is that the replacement strings 134 that are to be substituted into the topic titles 124 are determined by links 112 that link the replacement strings 134 to terms 104 obtained from the user's query. Thus, all substitution information in the on-line help module 36b is stored on a link basis. This aspect, in effect, provides that a term used in different queries can cause different substitutions in the same topic titles because the topic titles that are returned and the links that are finally used in the end are different.

In another aspect of the present invention, the text to be inserted into the topic titles 124 is in the form of an independent replacement string 134. Thus, the terms 104 obtained from the user's query are not merely inserted directly into the topic tiles 124. This aspect ensures that the topic titles 124 will remain in the proper case and tense, as well as make grammatical sense when the substitution are performed.

In another aspect of the present invention, the positioning within the topic titles 124, where the substitutions of the replacement strings 134 are to take place, is dictated by character position. This eliminates the need to identify word positions in the topic titles 124 are provides for universal application to all languages.

The foregoing system may be conveniently implemented in a on-line help module that is based upon the flow charts in FIGS. 3A–3C, 4 and 5, as well as the illustrations in FIGS. 1, 2A–2E, 6 and 7. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for presenting recognizable topic titles to a user in response to receiving a query, comprising the steps of:

analyzing the query to determine keyword terms that are substantively representative of the query;

searching a database for topic titles that are relevant based on the keyword terms;

providing a list of the relevant topic titles;

revising the list by revising the relevant topic titles to facilitate user recognition; and presenting the revised list including the revised topic titles to the user.

2. The computer-implemented method of claim 1, wherein the searching step comprises searching the database for links to topic titles that are relevant.

3. The computer-implemented method of claim 2, wherein the revising step comprises revising the topic titles in accordance with substitution information attached to the links.

4. The computer-implemented method of claim 3, wherein the substitution information comprises a replacement string, a left endpoint and a right endpoint, and wherein the step of revising the topic titles comprises the steps of:

retrieving the substitution information; and substituting the replacement string into the topic title relative to the left and right endpoints.

5. The computer-implemented method of claim 3, wherein the step of revising comprises, for each one of the topic titles, the steps of:

generating a substitution list to include the substitution information associated with each one of the links referencing the topic title;

resolving conflicts among the substitution information in the substitution list; and revising the topic title in accordance with the substitution information in the substitution list.

6. The computer-implemented method of claim 5, wherein the substitution information comprises a replacement string, a probability value, a left endpoint and a right endpoint which collectively form a line entry within the substitution list and wherein the step of resolving conflicts comprises the steps of:
   a. sorting the line entries with emphasis from right to left;
   b. determining if adjacent line entries have overlapping replacement strings;
   c. discarding the line entry having the lower probability if replacement strings overlap;
   d. repeating steps b–c until no overlapping replacement strings remain.

7. The computer-implemented method of claim 2, wherein the revising step comprises the steps of, for each one of the links and its corresponding topic title, retrieving a replacement string associated therewith and substituting the replacement string into the topic title.

8. The computer-implemented method of claim 7, wherein the topic title comprises a plurality of characters, and wherein the substituting step comprises substituting the replacement string into the associated topic title based on the positions of the characters.

9. The computer-implemented method of claim 2, wherein the rivising step comprises the steps of:
   determining a weighted relevance for each topic title;
   selecting a predetermined number of topic titles having the highest weighted relevances; and
   revising the selected topic titles in accordance with substitution information attached to the links.

10. A computer-readable medium on which is stored a computer program for presenting recognizable topic titles to a user in response to receiving a query, the computer program comprising instructions which, when executed by a computer, perform the steps of:
   analyzing the query to determine keyword terms that are substantively representative of the query;
   searching a database for topic titles that are relevant based on the keyword terms;
   providing a list of the relevant topic titles;
   revising the list by revising the relevant topic titles to facilitate user recognition; and
   presenting the revised list including the revised topic titles to the user.

11. The computer-readable medium of claim 10, wherein the searching step comprises searching the database for links to topic titles that are relevant.

12. The computer-readable medium of claim 11, wherein the revising step comprises revising the topic titles in accordance with substitution information attached to the links.

13. The computer-readable medium of claim 12, wherein the substitution information includes a replacement string, a right endpoint and a left endpoint, and wherein the step of revising the topic titles comprises the steps of:
   retrieving the substitution information; and
   substituting the replacement string into the topic title in accordance with the right and left endpoints.

14. The computer-readable medium of claim 12, wherein during the revising step, the program further performs, for each one of the topic titles, the steps of:
   generating a substitution list to include the substitution information associated with each one of the links referencing the topic title;
   resolving conflicts among the substitution information in the substitution list; and
   revising the topic title in accordance with the substitution information in the substitution list.

15. The computer-readable medium of claim 14, wherein the substitution information comprises a replacement string, a probability value, a left endpoint and a right endpoint which collectively form a line entry within the substitution list and wherein the step of resolving conflicts comprises the steps of:
   a. sorting the line entries with emphasis from right to left;
   b. determining if adjacent line entries have overlapping replacement strings;
   c. discarding the line entry having the lower relevance to the topic title if replacement strings overlap;
   d. repeating steps b–c until no overlapping replacement strings remain.

16. The computer-readable medium of claim 11, wherein the revising step comprises the steps of, for each one of the links and its corresponding topic title, retrieving a replacement string associated therewith and substituting the replacement string into the topic title.

17. The computer-readable medium of claim 16, wherein the topic title comprises a plurality of characters, and wherein the substituting step comprises substituting the replacement string into the associated topic title based on the positions of the characters.

18. The computer-readable medium of claim 11, wherein the revising step comprises the steps of:
   determining a weighted relevance for each topic title;
   selecting a certain number of topic titles having the highest weighted relevances; and
   revising the selected topic titles in accordance with substitution information attached to the links.

19. A computer system for receiving a query from a user and, in response thereto, presenting the user with recognizable topic titles, comprising:
   a. a processing unit (PU);
   b. an input device coupled to the PU;
   c. a pixel-based display device coupled to the PU;
   d. a printing device coupled to the PU;
   e. a memory storage device coupled to the PU; and
   f. the PU being operative to:
      i. analyzing the query to determine keyword terms that are substantively representative of the query;
      ii. searching a database for topic titles that are relevant based on the keyword terms;
      iii. providing a list of the relevant topic titles;
      iv. revising the list by revising the relevant topic titles to facilitate user recognition; and
      v. presenting the revised list including the revised topic titles to the user.

20. The computer system of claim 19, wherein the searching step comprises searching the database for links to topic titles that are relevant.

21. The computer system of claim 20, wherein the revising step comprises revising the topic titles in accordance with substitution information attached to the links.

22. The computer system of claim 21, wherein the substitution information comprises of a replacement string, a left endpoint and a right endpoint, and wherein, during the step of revising the topic titles, the PU is operative to perform the steps of:
   retrieving the substitution information; and substituting the replacement string into the topic title relative to the left and right endpoints.

23. The computer system of claim 21, wherein during the revising step, the PU is operative to perform, for each one of the topic titles, the steps of:

generating a substitution list to include the substitution information associated with each one of the links referencing the topic title;

resolving conflicts among the substitution information in the substitution list; and revising the topic title in accordance with the substitution information in the substitution list.

24. The computer system of claim 23, wherein the substitution information comprises a replacement string, a probability value, a left endpoint and a right endpoint which collectively form a line entry within the substitution list and wherein the step of resolving conflicts comprises the steps of:

a. sorting the line entries with emphasis from right to left;

b. determining if adjacent line entries have overlapping replacement strings;

c. discarding the line entry having the lower probability if replacement strings overlap; and d. repeating steps b–c until no overlapping replacement strings remain.

25. The computer system of claim 20, wherein during the revising step, the PU is further operative to perform the steps of, for each one of the links and its corresponding topic title, retrieving a replacement string associated therewith and substituting the replacement sting into the topic title.

26. The computer system of claim 25, wherein the topic title comprises a plurality of characters, and wherein the substituting step comprises substituting the replacement string into the associated topic title based on the positions of the characters.

27. The computer system of claim 20, wherein during the revising step, the PU is operative to perform the steps of:

determining a weighted relevance for each topic title;

selecting a predetermined number of topic titles having the highest weighted relevances; and revising the selected topic tides in accordance with substitution information attached to the links.

* * * * *